June 18, 1963     A. SUNNEN     3,094,698
AIR TRAFFIC DISPLAY SYSTEM
Filed Dec. 29, 1960     2 Sheets-Sheet 1
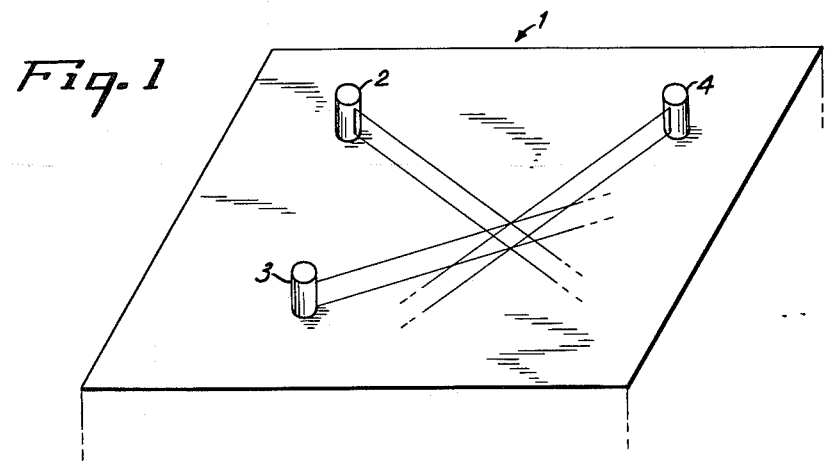
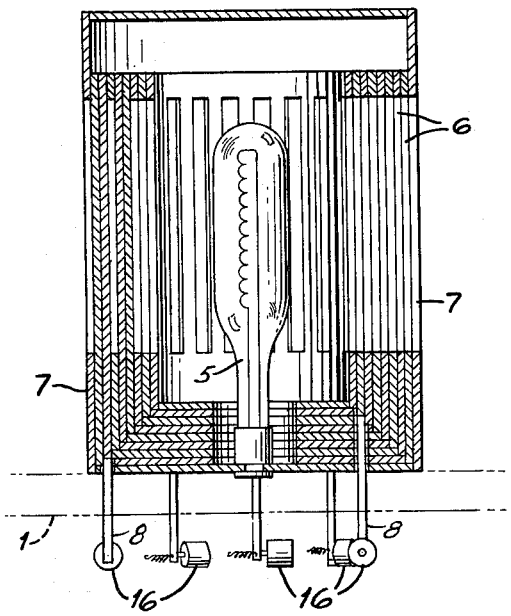
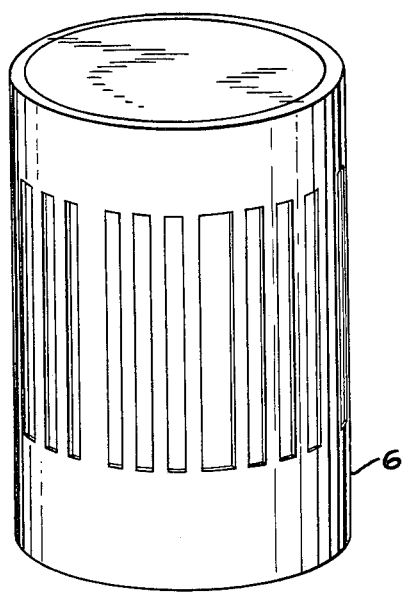
INVENTOR.
A. SUNNEN
BY June 18, 1963  A. SUNNEN  3,094,698
AIR TRAFFIC DISPLAY SYSTEM
Filed Dec. 29, 1960  2 Sheets-Sheet 2
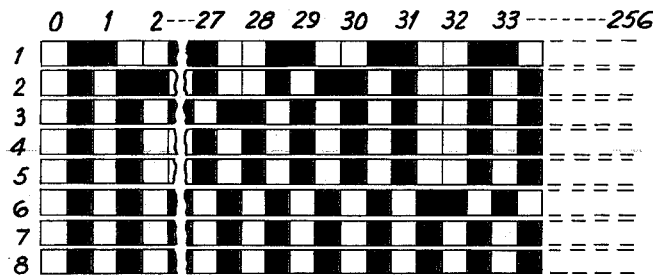
Fig. 4
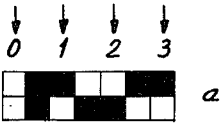
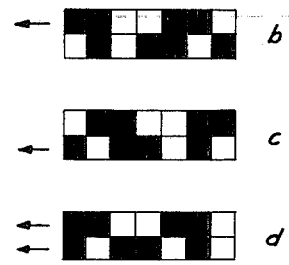
Fig. 5
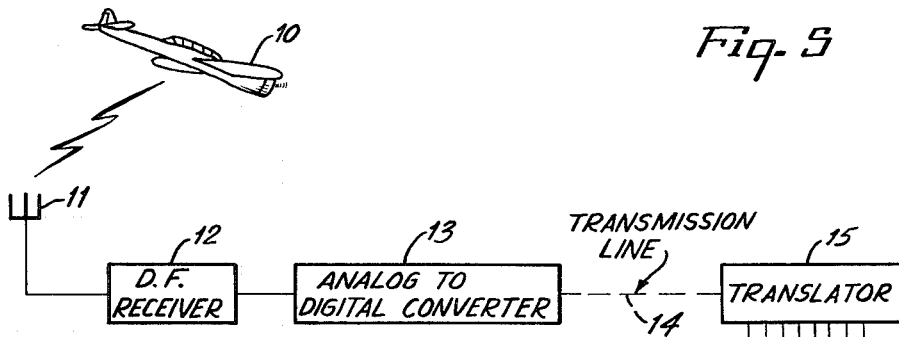
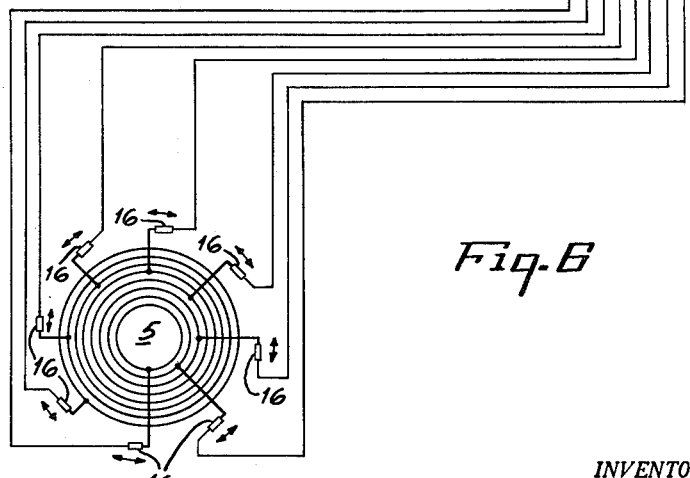
Fig. 6
INVENTOR.
A. SUNNEN
BY United States Patent Office 3,094,698
Patented June 18, 1963

3,094,698
AIR TRAFFIC DISPLAY SYSTEM
Andre Sunnen, Montclair, N.J., assignor to International Standard Electric Corporation, New York, N.Y., a corporation of Delaware
Filed Dec. 29, 1960, Ser. No. 79,354
5 Claims. (Cl. 343—112)

This invention relates to an air traffic control display system and more particularly, to an indicating arrangement for providing a visual display of the position of a mobile craft in a given area.

Due to the tremendous increase in air travel in the last few years many problems relating to the control of air traffic have been created in the aircraft industry. One of the areas in which considerable research has been done is in the development of a suitable system for displaying pictorially a moving vehicle in the air traffic control center, where commands as to landing and take-off are communicated to the pilots in the various crafts. Various proposals have been made in connection with the development of a system to produce simulated movement of the position, direction and identification of aircraft in pictorial form on a screen of relatively large dimensions. But these earlier systems proved to be rather complex and expensive and to have a poor response time for indicating the received signals from the craft.

In certain types of aircraft control systems it is conventional to display on the screen of a cathode ray tube a trace indicating the bearing of an aircraft with respect to a particular ground station. It should be noted, however, that in order to obtain real utility in the pictorial display it should be considerably larger than that obtainable on a cathode ray screen. Furthermore, in order to obtain an accurate position "fix" of the craft, it is also necessary to perform a triangulation wherein the respective traces representing the bearing of the craft with respect to differently located ground stations are produced, so that the intersection of these traces will give the position of the craft. In order to perform the triangulation it has hitherto been the practice either to provide a separate cathode ray tube for each trace and to combine the traces on the respective tubes optically; or else provide an electronic commutating arrangement enabling the traces to be displayed in turn on the screen of a single tube at a rate sufficient for the persistence of vision to enable the traces to appear to be simultaneous.

The first of these methods involves the use of individual projection tubes, optical mirrors, cathode ray tubes which result in a system that is somewhat cumbersome, inconvenient and not economically adapted to the provision of multiple displays. The second method contains practical difficulties as to size and cost of equipment and is limited as regards the number of separate traces which can be accommodated on a tube.

In addition, the problem of obtaining adequate brilliance and persistence is very difficult to solve in connection with cathode ray tube displays. Such cathode ray tube displays also contain a considerable number of extraneous indications such as dots and streaks from which only an experienced operator can determine the true bearing indications.

Furthermore, in certain traffic control systems the code converting equipment, which converts the bearing information into a code suitable for transmission, is rather complex and costly to manufacture.

Decoding arrangements have been developed wherein the bearing information is read directly in the desired code without employing a code converting device. The reading scale in these arrangements is usually calibrated in accordance with the selected code and is scanned with photoelectric cells to obtain a train of pulses characterizing the measured bearing information. Upon transmission of the information, the encoded values have to be decoded again at the receiving station in order to carry out either a visible or printed indication. In these arrangements, it is also necessary to convert the coded values in a decoding device into the code assigned to the visible indicating values before the indication is carried out.

In connection with air traffic control systems, another problem exists when many aircraft are flying over the control area simultaneously. The length of time during which signals corresponding to a particular "fix" may greatly vary from several seconds to a small fraction of a second. Under these circumstances it must be realized that the response time of the indicating system must be as small as possible, preferably of the order of a fraction of a second and that the brightness of the display must be great enough to provide legible indications under these conditions.

An object of the present invention is the provision of an improved air traffic indicating system for displaying mobile craft about a given area such as the vicinity of an airport.

Another object is the provision of an indicating device which greatly reduces the time of response to received signals, resulting in faster bearing indications.

Still another object is the provision of a display which produces extremely sharp clear traces on a screen.

A further object is the provision of a display system which is smaller in size, lighter in weight and less expensive to manufacture.

A feature of this invention is an indicator system for determining the position of a mobile craft which is responsive to a predetermined coded signal. The system comprises a source of radiant energy, for example, a light source and a plurality of cylinders concentrically arranged about said source. Each of said cylinders contains at least one opening for transmission of light therethrough, and is independently rotatable. There are means responsive to the coded signals for rotating each of said cylinders to a predetermined angular position whereby the openings are positioned in register thus permitting the transmission of light therethrough in a direction corresponding to the angular position of the craft.

The above-mentioned and other features and objects of this invention and the manner of attaining them will become more apparent and the invention itself will be best understood by reference to the following description of an embodiment of the invention taken in conjunction with the accompanying drawings, in which:

FIG. 1 is a perspective view of a display system embodying the principle of the present invention;

FIG. 2 is a sectional elevational view of one of the directional indicating devices;

FIG. 3 shows a perspective of one of the cylinders having a slotted binary pattern cut therein;

FIG. 4 shows a development of the eight coaxial cylinders representing the slot-strap combinations which produce the binary code;

FIGS. 5a–5d illustrate a simplified development of a part of coaxial cylinders; and FIG. 6 is a schematic representation of one of three identical chains of the triangulation system according to the invention.

Referring now to FIG. 1, the display system illustrated includes a screen 1 which is preferably of a large size on which line images representing the bearing of the craft are projected. The screen would be in the form of a map of the territory. The images on the screen are projected from directional indicating arrangements 2, 3 and 4 which are mounted on the screen and controlled by a plurality of rotating beacons located at remote points. These directional arrangements simulate the location of the three spaced beacons and are necessary for obtaining a triangulation display of the position of a mobile craft. These indicating arrangements are provided with optical digital decoding units which direct radiant energy such as light rays onto screen 1 in accordance with the beam signal received from the remote beacons. These light rays if desired could be of different colors so as to distinguish the different beacons. The indicating arrangements therefore produce three line images which would intersect substantially at a single point corresponding to the location of the craft with respect to the three rotating beacons. These three beacons would be of the type which transmit a binary coded signal for different directions of transmission. As can be seen from FIG. 1, preferably three such beacons would be used spaced apart over the given territory.

Referring now to FIG. 2 there is shown a sectional elevational view of one of the directional indicating arrangements. The arrangement is composed of a number of slotted coaxial cylinders 6 comprising slot-strap combinations for the representation of a normal binary code. A source of radiant energy in the form of a light source 5 is positioned coaxially of the cylinders 6. There are eight independently movable cylinders 6 having alternate light transparent and opaque strips forming slots and straps spaced and encoded in accordance with the separate elements of the desired code. In addition, there is a ninth stationary cylinder 7 fastened to the screen 1 which has uniform divisions or strips which serves as a cover or masking cylinder. The cylinders 7 which are mounted on the screen are provided with flaps which are staggered from each other and which extend through suitable openings in the screen. These flaps 8 are connected to individual driving units 16 located beneath the screen (see FIG. 6) which will angularly rotate each of the cylinders 6 in response to the received signal from said rotating beacon. The maximum angular rotation of each cylinder will correspond to the width of a strip.

FIG. 3 illustrates a perspective view of one of the moving cylinders 6, namely the third, which is selected for purposes of explanation. As can be seen the outer face of the cylinder will have cut therein in a direction parallel to its axis a certain number of slots which, with adjacent straps, will form a binary code such as provided by a binary code wheel. The code is arranged so that a strap-slot arrangement represents a binary digit 1 and a slot-strap arrangement represents a binary digit 0. The cylinder in FIG. 3 represents the slot-strap sequence for the third cylinder corresponding to the third digit of a binary number. The number of cylinders $n$ is related by the formula $2^n = N$ where N is equal to the number of discrete positions available.

In FIG. 4 there is shown a development of eight coaxial slotted cylinders arranged concentric to each other for the representation of angles as binary numbers. The cylinders which are divided according to the binary number system in segments are capable of representing 256 different angles. According to the invention $n$ slotted cylinders are arranged to represent two conditions, 0 and 1, for any angular position. Thus, the representation of the conditions may be carried out in any suitable binary code. When employing the normal type of binary code there will result a very simple and well-arranged division of "strap-slot" and "slot-strap" combinations in the indicating fields of the individual slotted cylinders. In such a case the angles included in the indicating fields are successively numbered from 1 to $2^n$, and the number will correspond at the same time to the condition to be represented.

For controlling the slotted cylinders there is respectively required 8-digit binary numbers. In the given example there is shown in the "slot-strap" or "strap-slot" combinations respectively a representation of the normal binary code. The slots are marked in the drawing by the white square sections, and the straps are marked by the black sections. As previously stated, the "slot-strap" combination is supposed to represent binary 0, and the "strap-slot" combination is supposed to represent a binary 1.

It will be easily recognized that, when displacing the first cylinder in FIG. 4 by the width of one slot element towards the left there will exist in the field a passage through all the cylinders which will correspond to the angle 1. When denoting the normal position of all cylinders by 0 and the displaced position by 1, then, in FIG. 4, with the first cylinder displaced, the cylinders will be in the position corresponding to 00000001. This means, that in this particular case the angle 1 is indicated because a coincidence of the cylinder slots for that angle will be obtained. All other angles in the field may be indicated by displacement of different combinations of the cylinders.

Due to this on-off arrangement, the positioning of each of the cylinders requires a rotation corresponding to the width of one slot element only, and the angle of rotation is identical for all cylinders. Therefore, an extremely small time of positioning can be achieved. A bright approximately linear light source, such as indicated in FIG. 2, can be used, or, as an alternative, a point source located at a point of the axis such that the light projected through the slots projects along the useful area of the map.

FIGS. 5a–5d illustrate a simplified development of a pair of coaxial cylinders for obtaining different angles. In FIG. 5a the cylinders are in the normal position 00 so that an indication is possible for the positional angle 0. Upon moving the upper cylinder (FIG. 5b) one element position to the left there is obtained a through passage for the angle 1.

In FIG. 5c the lower cylinder is moved one element position to the left, and a through passage is obtained for the angle 2. FIG. 5d shows the representation of the angle 3 by displacing both cylinders one element position to the left.

This arrangement according to the invention is especially suitable for the indication of angular values which are presented as binary numbers. The number of slot or strap divisions and the number of cylinders may be chosen at will depending on the required accuracy.

Referring to FIG. 6 there is shown a schematic diagram of one of the three identical chains of the rotating beacon systems which comprise the entire triangulation system. Each beacon system comprises an antenna 11 which feeds the transmitted signal from the craft 10 directly into the receiver 12 which detects the received signal. An example of a direction finder system suitable for such a beacon system is the commutated antenna direction finder (C.A.D.F.) type PQ manufactured by Standard Telephones and Cables Limited, London, England, as illustrated in their brochure entitled "(C.A.D.F.) Commutated Antenna Direction Finders PQ Series." The output of receiver 12 is connected to any well known type of analog-to-digital converter 13 which is capable of converting the analog output signal of receiver 12 to a corresponding coded sequence of binary signals. These signals are then transmitted via any suitable form of transmisison means 14 such as wire lines or micro-wave links etc. to a translator 15 located at a remote air traffic control center. Translator 15 may be of any well-known type which includes the combination of a stepping register connected to a plurality of gating circuits which correspond to the number of coded cylinders.

Instead of binary signals it should be remembered that frequencies may be used as, for example, in a frequency division multiplex system in which case the output of the analog-to-digital converter 13 is fed into a multiplex system having a number of channels corresponding to the number of coded cylinders. The output of the channels being fed directly to the individual driving mechanisms 16 for controlling the movement of each cylinder.

As has been previously stated the indicating arrangements are located at an air traffic control center remote from the roating beacons. At the air traffic control center the translator 15 translates the binary input signals into 8 separate "on" or "off" signals. These signals are transmitted to separate driving means which control the movement of each of the cylinders via the flaps 8 located beneath screen 1. These signals will result in an alignment of the transparent portions of each of the cylinders to correspond to the angular position of the mobile craft. When the corresponding transparent portions of each cylinder are in register then a ray of light will be transmitted therethrough in a direction corresponding to the angular position of the craft. The intersection of the respective rays of light from each indicating arrangement 2, 3 and 4 will determine the position of the mobile craft on the screen.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In air air traffic control arrangement having at least one receiving system responsive to radiant energy transmitted from a craft indicative of the azimuth of said craft for determining the position of said craft, the combination comprising means for receiving said radiant energy, means coupled to said receiver for converting said received energy into a first code having a plurality of code elements, an indicator system coupled to said converting means, said indicator system comprising a plurality of concentrically arranged cylinders there being one cylinder per code element, a source of radiant energy positioned within said cylinders, each of said cylinders containing at least one region of predetermined area transparent to said source of radiant energy and each cylinder rotatable independently of the other, means responsive to said converting means for selectively and angularly displacing said cylinders respectively in accordance with the corresponding code elements whereby a transparent region of each cylinder is positioned in register permitting the transmission of energy therethrough in a direction corresponding to the angular position of the craft.

2. In an air traffic control arrangement having a plurality of receiving systems arranged at predetermined points responsive to radiant energy transmitted from a craft indicative of the azimuth of said craft, the combination comprising means at each point for receiving said radiant energy, means coupled to said receiver for converting said received energy into a code having a plurality of code elements, an indicator system coupled to said converting means, said indicator system comprising a plurality of concentrically arranged cylinders, there being one cylinder per code element, each of said cylinders having a predetermined code pattern of opaque and transparent elements, said pattern being designed to provide a different registration of transparent elements for each angular position of said craft, a source of radiant energy positioned within said cylinders, means for selectively and angularly displacing said cylinders respectively in accordance with the corresponding code elements to a registration position of said transparent elements whereby energy from said source will be transmitted therethrough in a direction corresponding to the angular position of said craft.

3. In an air traffic control system the combination as in claim 2 in which the transparent regions of each cylinder are so arranged that an alignment of transparent regions will occur at a particular angular direction when a particular combination of said cylinders is moved at an angle not exceeding the angle corresponding to the width of the narrowest transparent regions.

4. In an air traffic control arrangement the combination as in claim 2 wherein said source of energy positioned within said cylinders is light.

5. In an air traffic control arrangement the combination as in claim 2 further comprising a screen corresponding to the field covered by said receiving systems, means for mounting the indication system on the screen at positions corresponding to the receiving systems, the indicating systems being so arranged that the light source from each indicating system will intersect at a point indicative of the position of said craft in the field covered by said screen.

References Cited in the file of this patent
UNITED STATES PATENTS

| | | |
|---|---|---|
| 2,592,719 | McGuigan | Apr. 15, 1952 |
| 2,601,610 | Hatch et al. | June 24, 1952 |
| 2,864,081 | Steelman | Dec. 9, 1958 |